United States Patent
Okumura et al.

(10) Patent No.: US 7,106,404 B2
(45) Date of Patent: Sep. 12, 2006

(54) TRANSFLECTIVE LIQUID CRYSTAL DISPLAY DEVICE HAVING SURFACE ROUGHNESS IN THE TRANSMISSIVE AREA AND HOMEOTROPIC ALIGNMENT

(75) Inventors: Osamu Okumura, Suwa (JP); Tsuyoshi Maeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 10/736,560

(22) Filed: Dec. 17, 2003

(65) Prior Publication Data

US 2004/0155999 A1    Aug. 12, 2004

(30) Foreign Application Priority Data

Jan. 24, 2003  (JP)  ............................. 2003-016220
Aug. 4, 2003  (JP)  ............................. 2003-286213

(51) Int. Cl.
    G02F 1/1335  (2006.01)
(52) U.S. Cl. ...................... 349/114; 349/113
(58) Field of Classification Search ........ 349/113–114, 349/130
    See application file for complete search history.

(56) References Cited

U.S. PATENT DOCUMENTS 6,753,939 B1  6/2004 Jisaki et al.
6,822,708 B1  11/2004 Fujino .................. 349/113

FOREIGN PATENT DOCUMENTS

| JP | A 10-319422 | 12/1998 |
| JP | 11-052385 | 2/1999 |
| JP | 11-237606 | 8/1999 |
| JP | A 11-242226 | 9/1999 |
| JP | A 2001-075091 | 3/2001 |
| JP | 2002-90742 | 3/2002 |
| JP | A 2002-323705 | 11/2002 |
| JP | A 2002-350853 | 12/2002 |
| JP | A 2003-005173 | 1/2003 |

OTHER PUBLICATIONS

Makoto Jisaki et al.; "Development of transflective LCD for high contrast and wide viewing angle by using homeotropic alignment"; Asia Display/IDW 2001; pp. 133-136.

Primary Examiner—Tarifur R. Chowdhury
Assistant Examiner—Wang
(74) Attorney, Agent, or Firm—Oliff & Berridge, PLC

(57) ABSTRACT

To provide a transflective liquid crystal display device that achieves high-contrast, bright display with a wide viewing angle, a liquid crystal display device includes a liquid crystal layer between a pair of substrates, and also includes dot regions, each having a transmissive display area and a reflective display area. The liquid crystal layer includes negative dielectric anisotropy liquid crystals with homeotropic alignment in an initial state. The reflective display area includes an insulation film to form irregularities on a reflective film. The insulation film is also disposed in the transmissive display area and forms irregularities on one of liquid-crystal contact surfaces of the substrates between which the liquid crystal layer is disposed.

13 Claims, 12 Drawing Sheets

TRANSFLECTIVE LIQUID CRYSTAL DISPLAY DEVICE HAVING SURFACE ROUGHNESS IN THE TRANSMISSIVE AREA AND HOMEOTROPIC ALIGNMENT

BACKGROUND OF THE INVENTION

1. Field of Invention

The present invention relates to a liquid crystal display device and an electronic apparatus, and particularly, to a transflective liquid crystal display device that displays both in reflective and transmissive modes to achieve a high-contrast, wide-viewing-angle display.

2. Description of Related Art

Related art liquid crystal display devices having both a reflective mode and a transmissive mode are transflective liquid crystal display devices. In a transflective liquid crystal display device, a liquid crystal layer is disposed between an upper substrate and a lower substrate. Provided on the inner surface of the lower substrate is a metallic reflective film formed of, for example, aluminum having apertures for light transmission. This reflective film functions as a transflector. In the reflective mode, external light incident on the upper substrate passes through the liquid crystal layer and is then reflected by the reflective film disposed on the inner surface of the lower substrate. The reflected light passes through the liquid crystal layer again and is emitted from the upper substrate so as to achieve display. On the other hand, in the transmissive mode, light emitted from a backlight enters the lower substrate and then passes through the apertures of the reflective film. The light passes through the liquid crystal layer and is then emitted outward from the upper substrate to achieve display. Accordingly, the apertures disposed in the reflective film function as transmissive display areas and the other areas function as reflective display areas.

The related art transflective liquid crystal display device, however, is disadvantageous in having a narrow viewing angle for the transmissive display. To prevent parallax error, the transflector is disposed on the inner surface of the liquid crystal cell. For this reason, the reflective display is performed with only a single polarizer provided adjacent to the viewer, leading to a restricted optical layout. To address this problem, a related art type of liquid crystal display device that uses homeotropic liquid crystal alignment is disclosed by "Development of transflective LCD for high contrast and wide viewing angle by using homeotropic alignment", M. Jisaki et al., Asia Display/IDW'01, p.133–136 (2001). The liquid crystal display device of this type has the following three characteristics.

(1) The device uses a "VA (vertical alignment) mode" in which liquid crystals having negative dielectric anisotropy are aligned vertically on the substrate and are tilted when a voltage is applied.

(2) The device uses a "multi-gap structure" in which the thickness of the liquid crystal layer (cell gap) in the transmissive display areas is different from that in the reflective display areas Japanese Unexamined Patent Application Publication No. 11-242226.

(3) The device uses a "multi-domain structure". This means that each transmissive display area is octagonal, and the transmissive display area on an opposing substrate has a protrusion at the central area so that liquid crystal molecules are tilted in multiple directions within this area.

SUMMARY OF THE INVENTION

According to Jisaki et al., the tilting directions of liquid crystal molecules in each transmissive display area are determined by a protrusion disposed at the center of the area. The manufacture of this structure requires one additional process, and therefore, increases the cost. However, if the tilting directions are not regulated and the liquid crystal molecules are tilted in a disorderly manner, a discontinuous line, called a disclination, appears along the boundary between different liquid-crystal alignment areas, possibly leading to, for example, after images. Because the alignment areas of the liquid crystals have different viewing-angle properties, spot-like graininess may be seen when the liquid crystal display device is viewed from an angle.

The present invention addresses the problems described above by providing a transflective liquid crystal display device that reduces or prevents display defects, such as after images and spot-like graininess, and that allows wide-viewing-angle display. The present invention further provides a simple and suitable technique to control the tilting directions of liquid crystal molecules in the transmissive display areas, and also to provide a wide-viewing-angle, liquid crystal display device that displays uniformly in both reflective and transmissive displays.

To achieve the above, a liquid crystal display device of an aspect of the present invention is provided with a liquid crystal layer between a pair of substrates, and also with dot regions each having a transmissive display area for transmissive display and a reflective display area for reflective display. The liquid crystal layer includes negative dielectric anisotropy liquid crystals with homeotropic alignment in an initial state. The reflective display area includes light-diffusing means to diffuse reflected light, and the transmissive display area includes a liquid-crystal-contact-surface-roughness-forming device to form irregularities on one of liquid-crystal contact surfaces of the substrates between which the liquid crystal layer is disposed. The light-diffusing device and the liquid-crystal-contact-surface-roughness-forming device are formed of the same material.

The liquid crystal display device of an aspect of the present invention is a transflective liquid crystal display device having liquid crystals in a homeotropic mode, and is particularly subjected to controlling the alignment directions of the liquid crystals in the homeotropic mode when a voltage is applied. Negative anisotropy liquid crystals are generally used in the homeotropic mode, and since the liquid crystal molecules, which are aligned perpendicular to the substrate surface in the initial state, are tilted by applying an electric field, the tilting directions of the molecules cannot be regulated unless they are given a preliminary treatment (given a pretilt alignment). This may disturb the alignment (disclination) and cause a display defect, such as light leakage, thus deteriorating the display properties. For this reason, the control of the alignment directions of the liquid crystal molecules during voltage application is a significant factor when employing liquid crystals in the homeotropic mode.

In each transmissive display area of the liquid crystal display device of an aspect of the present invention, one of the liquid-crystal contact surfaces is provided with irregularities that pretilt the liquid crystal molecules, which are given a homeotropic alignment in the initial state. Consequently, the tilting directions of the liquid crystal molecules are regulated or controlled, and disturbed alignment (disclination) is therefore unlikely to occur, thus reducing or preventing a display defect, such as light leakage. Display defects, such as after images and spot-like graininess, are thus reduced or prevented, and a liquid crystal display device with a wide viewing angle is achieved.

Because the liquid-crystal-contact-surface-roughness-forming device in the transmissive display area and the light-diffusing device in the reflective display area are formed of the same material, an additional component is not required for the liquid-crystal-contact-surface-roughness-forming device. The irregularities of the liquid-crystal-contact surface are thus formed simply, reducing the manufacturing cost.

According to an aspect of the present invention, the light-diffusing function achieves good reflective display. Furthermore, because the irregularities on the liquid-crystal contact surface in the transmissive display area are formed using the same material used for the light-diffusing device, a liquid crystal display device with wide-viewing-angle display properties is achieved.

The light-diffusing device and the liquid-crystal-contact-surface-roughness-forming device may be formed of, for example, a single layer. Furthermore, the two may be formed in the same manufacturing process to further enhance the manufacturing efficiency.

According to another aspect of the present invention, a liquid crystal display device includes a liquid crystal layer between a pair of substrates, and dot regions each having a transmissive display area for transmissive display and a reflective display area for reflective display. The liquid crystal layer includes negative dielectric anisotropy liquid crystals with homeotropic alignment in an initial state. The reflective display area and the transmissive display area include a resin layer provided with a predetermined pattern. The resin layer functions as light-diffusing device in the reflective display area for diffusing reflected light, and also functions as liquid-crystal-contact-surface-roughness-forming device, in the transmissive display area, to form irregularities in one of liquid-crystal contact surfaces of the substrates between which the liquid crystal layer is disposed. Like this, the resin layer is formed with a predetermined pattern over the reflective display area and the transmissive display area in the same manufacturing process and may function as the light-diffusing device and the liquid-crystal-contact-surface-roughness-forming device in the two respective areas.

The pair of substrates may consist of an upper substrate body and a lower substrate body. The side of the lower substrate body opposite to the liquid crystal layer may be provided with a backlight for transmissive display, and the side of the lower substrate body adjacent to the liquid crystal layer may be provided with a reflective film disposed selectively over the reflective display area. The reflective display area may include an irregular layer, as the light-diffusing device, on which the reflective film is disposed so that the reflective film is provided with irregularities. In this case, the irregularities of the reflective film effectively diffuse the reflected light. The irregular layer is also disposed in the transmissive display area to regulate the tilting directions of the liquid crystal molecules.

The liquid-crystal contact surface in the reflective display area may be provided with irregularities which correspond to the irregularities on the reflective film. The irregularities of the liquid-crystal contact surface determine the directions in which the homeotropically-aligned liquid crystal molecules are tilted based on a change in the electric field. In this case, because the irregularities on the liquid-crystal contact face in the reflective display area correspond to the light-diffusing irregularities on the reflective film, additional devices to form irregularities in the reflective display area are not necessary. The formation of the light-diffusing irregularities on the reflective film enhances the diffusion of the reflected light and reduces or prevents ambient reflections. Furthermore, because the irregularities on the liquid-crystal contact surface correspond to these light-diffusing irregularities, the manufacturing is remarkably simplified. Accordingly, the light-diffusing irregularities contribute to an enhanced reflective display, as well as achieving wide-viewing-angle properties in the reflective display areas, with a simple structure. Furthermore, because the irregularities on the liquid-crystal contact surface in each transmissive display area are formed using the roughness-forming device originally formed with the same layer or material or in the same manufacturing process as the device to form the light-diffusing irregularities, a liquid crystal display device with outstanding display properties for both reflective and transmissive displays can be provided.

The irregularities provided on the liquid-crystal contact surface of an aspect of the present invention can regulate the tilting directions of the homeotropically-aligned liquid crystal molecules. In this case, these liquid crystal molecules may be tilted regularly in the predetermined directions. As a result, disturbed alignment (disclination) of the liquid crystal molecules is unlikely to occur, thus reducing or preventing a display defect, such as light leakage. Accordingly, a liquid crystal display device with enhanced display properties can be provided. In detail, for regulating the tilting directions of the liquid crystal molecules, each irregular portion may be given a predetermined inclination angle with respect to the direction of the homeotropically-aligned liquid crystal molecules.

In as aspect of the present invention, the irregularities on the reflective film and on each transmissive display area may be formed using the same roughness-forming layer (irregular layer). By using the same roughness-forming layer, the irregularities on the reflective and transmissive display areas can be formed in a single manufacturing process. In this case, the roughness-forming layer may be disposed over the entire surface of the lower substrate body adjacent to the liquid crystal layer.

Furthermore, in an aspect of the present invention, the irregularities on the reflective film and on each transmissive display area may be formed in the same manufacturing process. In other words, the irregularities do not necessarily have to be formed by the same roughness-forming layer. In this case, even if the irregularities are formed using, for example, different roughness-forming layers (for example, layers composed of different materials), the formation of the irregularities on the liquid-crystal contact surface may be performed by the same manufacturing process as the irregularities on the reflective film, whereby the irregularities can be readily formed in the two areas.

To form irregularities on the reflective film, irregularities may be formed, for example, over the surface of the lower substrate body adjacent to the liquid crystal layer. These irregularities of the lower substrate body may also be formed over the transmissive display area to be used for forming irregularities on the liquid-crystal contact surface in the transmissive display area. Accordingly, the irregularities disposed over both the reflective display area and the transmissive display area of the lower substrate body may be used as topographical patterns to which the light-diffusing irregularities for the reflective film correspond, and to which the irregularities for the liquid-crystal contact surface in the transmissive display area and/or the reflective display area also correspond. This further simplified structure enhances the display properties and contributes to simple manufacturing.

To form irregularities on the reflective film, a resin layer having irregularities, for example, may be disposed between the lower substrate body and the reflective film. The resin layer may also be disposed in the transmissive display area to be used to form irregularities on the liquid-crystal contact surface in the transmissive display area. Accordingly, the resin layer disposed on the lower substrate body adjacent to the liquid crystal layer provides irregularities over both the reflective display area and the transmissive display area. These irregularities may be used as topographical patterns to which the light-diffusing irregularities for the reflective film correspond, and to which the irregularities for the liquid-crystal contact surface in the transmissive display area and/or the reflective display area also correspond. This further simplified structure enhances the display properties and contributes to simple manufacturing.

The height of the irregularities on the transmissive display areas is preferably 0.05 μm to 1.0 μm. When the height is below 0.05 μm, the tilting directions of the liquid crystal molecules cannot always be regulated. On the other hand, when the height is above 1.0 μm, the difference in retardation of the liquid crystal layer between the protruding and depressed portions of the irregularities becomes too large and may deteriorate the display properties. The height of the irregularities is preferably about 0.07 μm to 0.2 μm to further enhance the display.

Each irregular portion on the transmissive display areas may be provided with an inclined plane which preferably has a maximum angle of inclination of 2° to 20°. The angle of inclination in this case is an angle defined between the substrate body and each of the inclined planes of the irregularities. If the irregularities have curved surfaces, the angle is defined between the substrate body and a plane tangential to each of the curved surfaces. If the maximum angle of inclination is less than 2°, it may be difficult to regulate the tilting directions of the liquid crystal molecules. On the other hand, if the maximum angle exceeds 20°, light leakage, for example, may occur from the inclined planes and may cause a defect, such as contrast deterioration.

The inner surface of at least one of the pair of substrates may include at least one protrusion that functions as the liquid-crystal-contact-surface-roughness-forming device. Furthermore, an electrode having at least one opening may be disposed over the inner surface such that the opening corresponds to the protrusion. In this case, the electrode is not disposed over the protrusion, and the protrusion tilts the liquid crystal molecules and electric flux lines in opposite directions. Accordingly, the tilting directions of the liquid crystal molecules are readily set, and the alignment of the liquid crystal molecules can be regulated with further stability. Furthermore, the at least one protrusion may also be formed using a color-filter layer. Like this, by providing the opening of the electrode corresponding to the protrusion, the alignment of the liquid crystal molecules can be regulated with further stability.

An electronic apparatus of an aspect of the present invention includes the liquid crystal display device described above. This electronic apparatus is capable of reducing or preventing display defects, such as after images and spot-like graininess, and provides a high-quality display that achieves wide-viewing-angle display properties.

DETAILED DESCRIPTION OF PREFERRED EMBODIMENTS

First Exemplary Embodiment

A first exemplary embodiment of the present invention will now be described with reference to the figures.

The first exemplary embodiment is an active-matrix liquid crystal display device employing thin film transistors (referred to as TFTs hereinafter) as switching elements.

Figure 1:
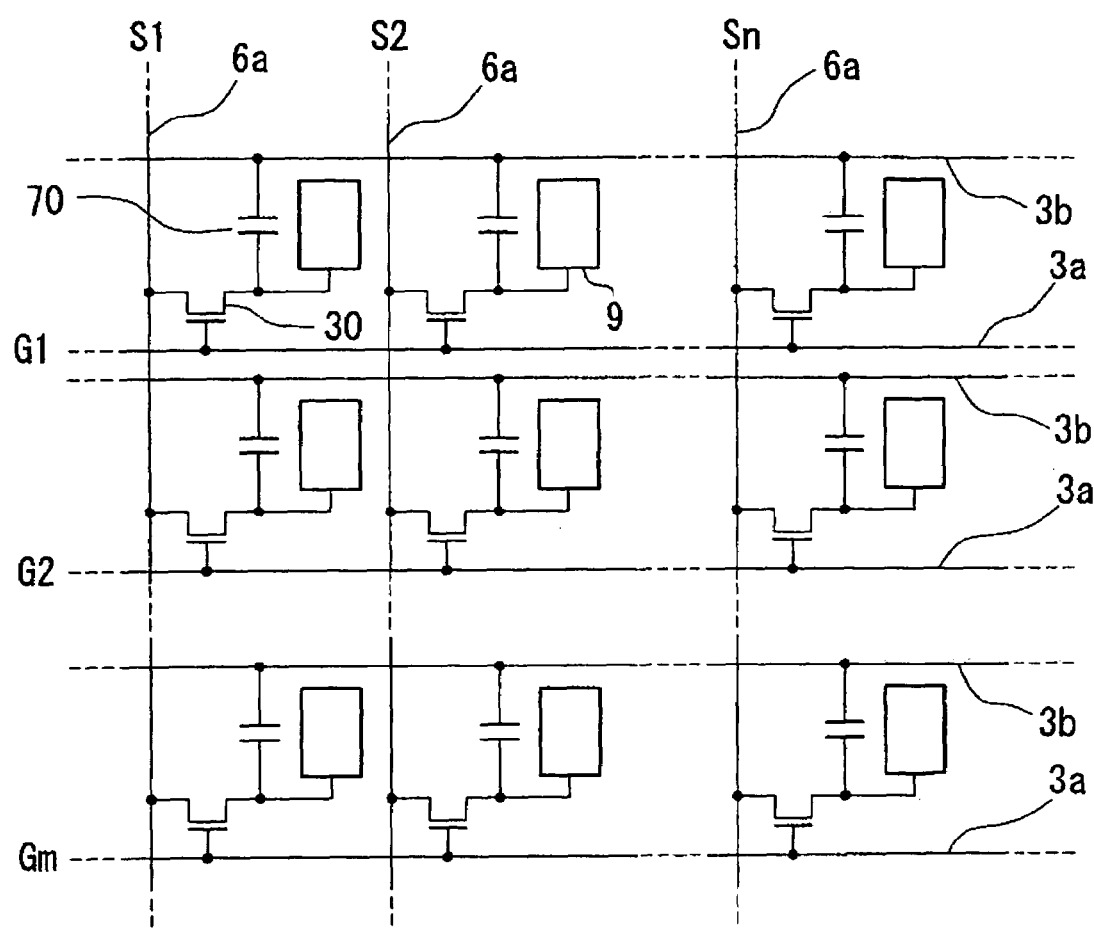
FIG. 1 illustrates an equivalent circuit schematic of a liquid crystal display device according to a first exemplary embodiment of the present invention.
Figure 2:
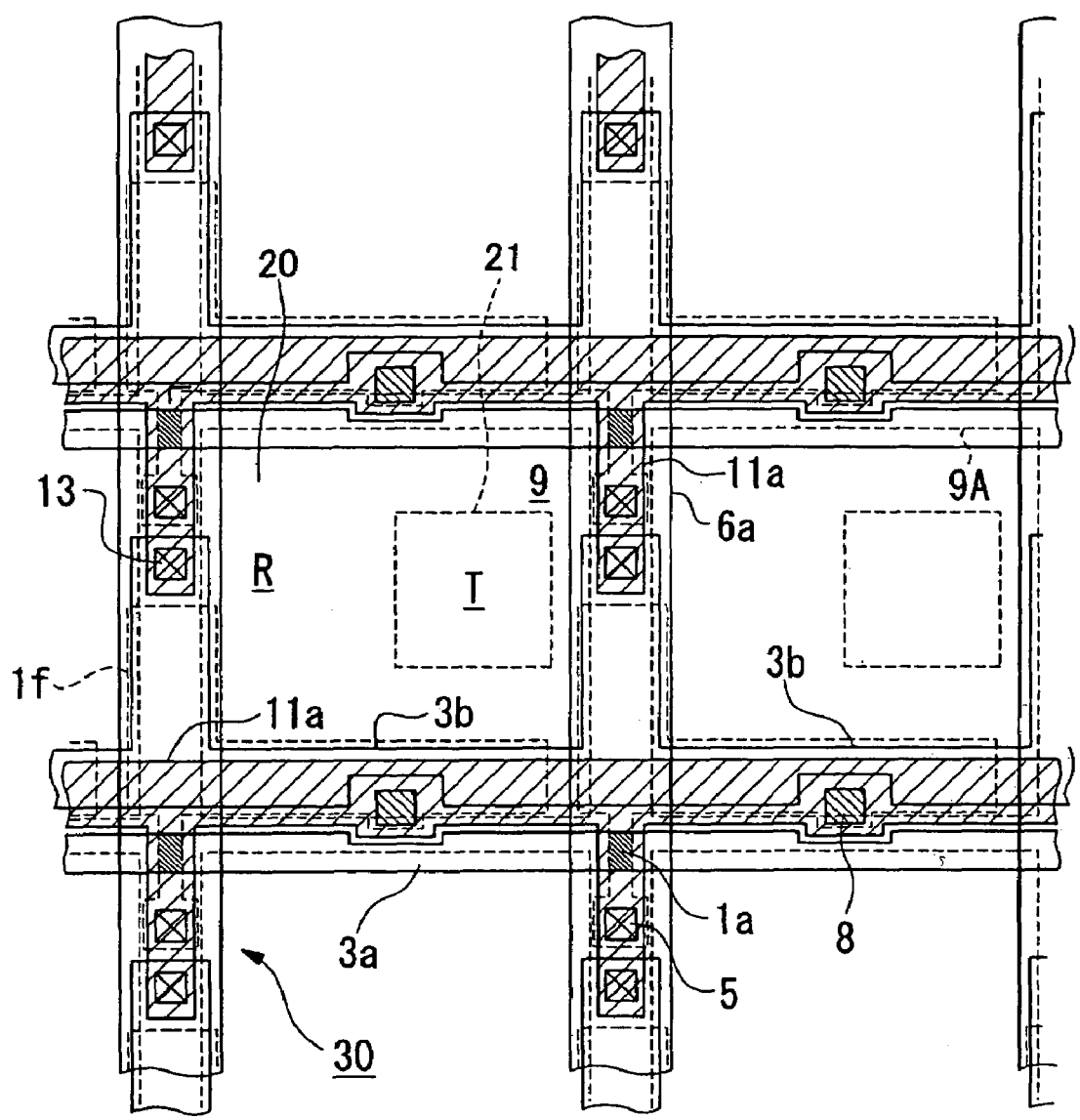
FIG. 2 is a plan view of dots of the liquid crystal display device according to the first exemplary embodiment.

FIG. 1 illustrates an equivalent circuit schematic having a plurality of dots arranged in a matrix forming an image display region of the liquid crystal display device according to the first exemplary embodiment. FIG. 2 is a plan view of the dots disposed adjacent to one another on a TFT-array substrate. FIG. 3 includes a plan view (upper half of the figure) and a cross-sectional view (lower half of the figure) of the liquid crystal display device. In each of the figures, each layer and component is shown at a different scale to improve viewability.

Referring to FIG. 1, in the liquid crystal display device of the first exemplary embodiment, the plurality of dots arranged in a matrix forming the image display region each includes a pixel electrode 9 and a TFT 30, which is a switching element to control the pixel electrode 9. Each of data lines 6a, to which image signals are supplied, is electrically connected to sources of the corresponding TFTs 30. Image signals S1, S2, . . . , Sn, which are written onto the data lines 6a, are supplied in that order to the data lines 6a. Alternatively, the signals may be supplied to each group of data lines 6a disposed adjacent to one another. Each of a plurality of scanning lines 3a is electrically connected to gates of the corresponding TFTs 30. Scanning signals G1, G2, . . . , Gm are sequentially applied to the scanning lines 3a in pulses at a predetermined timing in that order. Each pixel electrode 9 is electrically connected to a drain of the corresponding TFT 30. By switching on the TFT 30, which is a switching element, for a certain period of time, one of the image signals S1, S2, . . . , Sn supplied from the corresponding data line 6a is written onto the pixel electrode 9 at a predetermined timing.

The image signals S1, S2, . . . , Sn that are written on the liquid crystals at a predetermined level via the pixel electrodes 9 are held between the pixel electrodes 9 and a common electrode, which will be described below, for a certain period of time. The molecular alignment and order of the liquid crystals change according to the applied voltage level so as to modulate light, thus achieving gradation display. To reduce or prevent the held image signals from leaking, storage capacitors 70 are provided in parallel with liquid crystal capacitances formed between the pixel electrodes 9 and the common electrode. Each reference character 3b indicates a capacitor line.

Referring to FIG. 2, the planar structure of the TFT-array substrate of the liquid crystal display device according to the first exemplary embodiment will now be described.

As is shown in FIG. 2, a plurality of rectangular pixel electrodes 9 (outlined by dashed lines 9A) are arranged in a matrix on the TFT-array substrate. The data lines 6a are provided along the vertical edges of the pixel electrodes 9, and the scanning lines 3a and the capacitor lines 3b are provided along the horizontal edges of the pixel electrodes 9. In the first exemplary embodiment, each pixel electrode 9 and each surrounding region of the pixel electrode 9 including, for example, the data lines 6a, one of the scanning lines 3a, and one of the capacitor lines 3b form one dot region. Each of the dot regions arranged in a matrix functions as a part of the display.

Each data line 6a is electrically connected to source areas of semiconductor layers 1a formed of, for example, polysilicon in the TFTs 30 via contact holes 5. Each pixel electrode 9 is electrically connected to a drain area of the corresponding semiconductor layer 1a via a contact hole 8. Each scanning line 3a is disposed facing channel areas (areas indicated by negative sloping line in the figure) of the semiconductor layers 1a and functions as gate electrodes in the sections facing the channel areas.

Each capacitor line 3b includes a main segment extending substantially straight along the scanning line 3a (in other words, a first segment formed along the scanning line 3a in plan view), and projecting segments which extend toward the upper level (upward in the figure) along the data lines 6a from the point where the capacitor line 3b and the data lines 6a intersect (in other words, second segments extending along the data lines 6a). In FIG. 2, a plurality of first light-blocking films 11a are provided in areas indicated by positive sloping line.

In detail, each of the first light-blocking films 11a covers the TFTs 30 including the channel areas of the semiconductor layers 1a as seen from the TFT-array substrate side. Furthermore, each first light-blocking film 11a includes a main segment extending straight along the scanning line 3a and facing the main segment of the capacitor line 3b, and projecting segments which extend toward the lower level (downward in the figure) along the data lines 6a from the point where the first light-blocking film 11a and the data lines 6a intersect. Below the data lines 6a, the tips of the downward projecting segments of the first light-blocking films 11a in each level (pixel row) overlap with the tips of the upward projecting segments of the capacitor lines 3b in the subsequent level. In these overlapping sections, contact holes 13 are provided to electrically connect the first light-blocking films 11a with the capacitor lines 3b. In other words, in the first exemplary embodiment, each first light-blocking film 11a is electrically connected with each capacitor line 3b of the upper level or the lower level via the corresponding contact hole 13.

Referring to FIG. 2, each dot region has a reflective film 20 therein. The area with the reflective film 20 acts as a reflective display area R, and the area without the reflective film 20, that is, an aperture 21 in the reflective film 20, acts as a transmissive display area T.

Figure 3A:
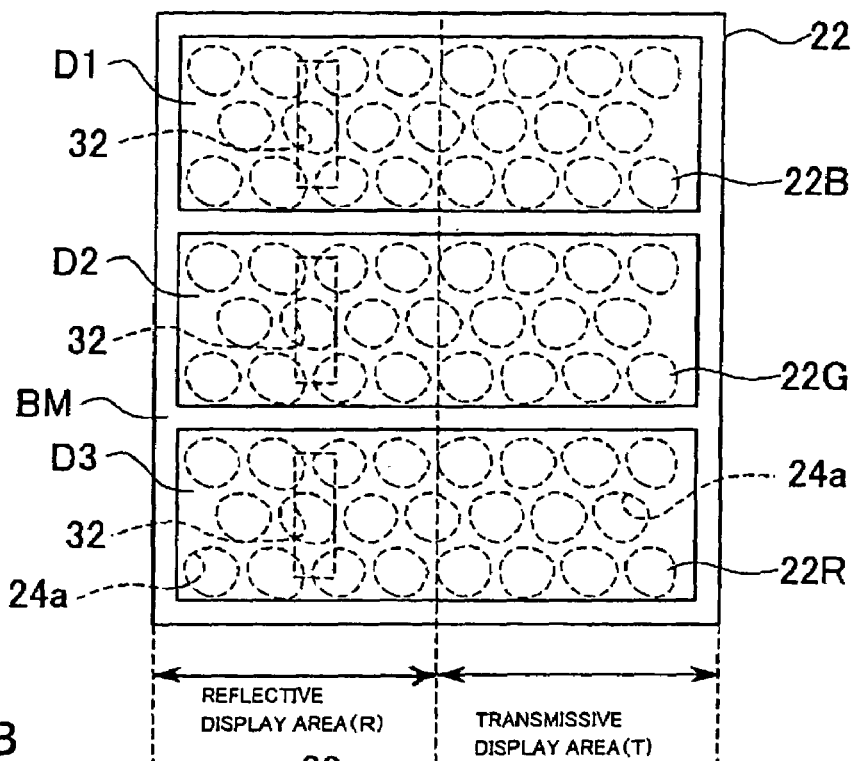
FIGS. 3(A) and 3(B) include a schematic plan view and cross-sectional view showing relevant components of the liquid crystal display device according to the first exemplary embodiment.
Figure 3B:
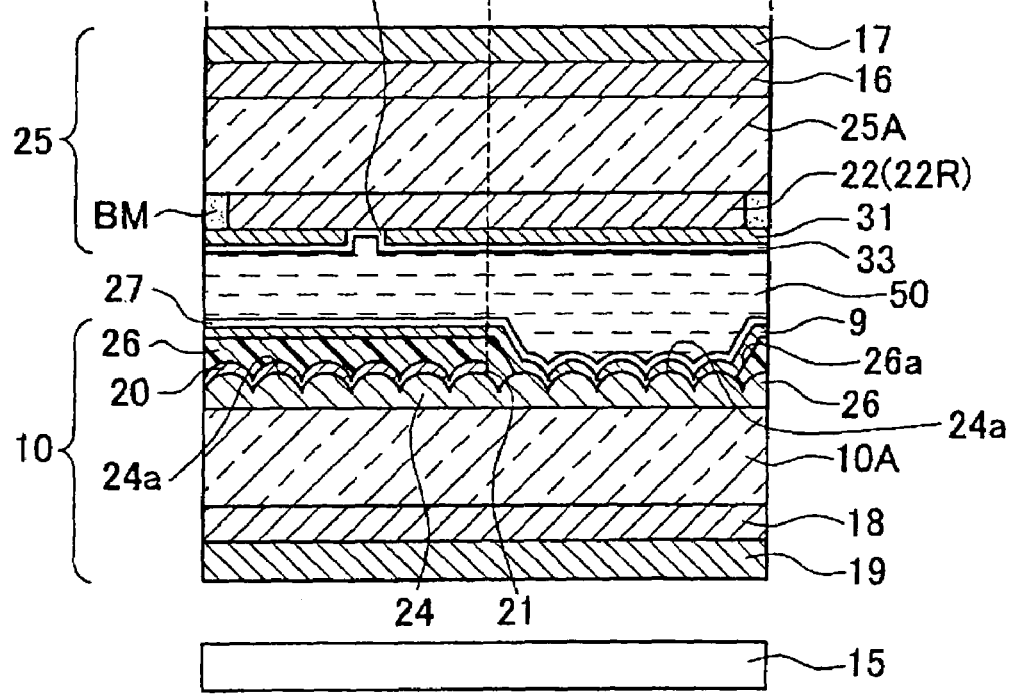

Referring to FIG. 3, the planar structure and the cross-sectional structure of the liquid crystal display device according to the first exemplary embodiment will now be described. FIG. 3(A) is a schematic plan view showing the planar structure of color-filter layers provided in the liquid crystal display device of the first exemplary embodiment. FIG. 3(B) is a schematic cross-sectional view taken along a section corresponding to a red-colored layer in FIG. 3(A).

As is shown in FIG. 2, the liquid crystal display device of the first exemplary embodiment has dot regions each of which includes a pixel electrode 9 in a region surrounded by, for example, the data lines 6a, one of the scanning lines 3a, and one of the capacitor lines 3b. As is shown in FIG. 3(A), for every dot region, a colored layer with one of the three primary colors is provided. Three dot regions (D1, D2, and D3) form a pixel that includes colored layers 22B (blue), 22G (green), and 22R (red).

As is shown in FIG. 3(B), the liquid crystal display device of the first exemplary embodiment has a liquid crystal layer 50 disposed between a TFT-array substrate 10 and an opposing substrate 25 facing the TFT-array substrate 10. The liquid crystal layer 50 is formed of negative dielectric anisotropy liquid crystals with homeotropic alignment in the initial state. The TFT-array substrate 10 includes a main substrate body 10A formed of a transparent material, such as quartz and glass; an insulation film 24 disposed over the main substrate body 10A; and a reflective film 20 formed of a highly reflective metal, such as aluminum and silver, disposed partially over the insulation film 24. As described previously, in each dot region, the area in which the reflective film 20 is disposed functions as the reflective display area R, and the area without the reflective film 20, that is, the aperture 21 in the reflective film 20, acts as the transmissive display area T. Accordingly, the liquid crystal display device of the first exemplary embodiment is a homeotropically-aligned, transflective liquid crystal display device having a homeotropically-aligned liquid crystal layer 50 and achieving both reflective and transmissive display.

The insulation film 24 disposed over the main substrate body 10A has irregularities 24a on the surface. Thus, the surface of the reflective film 20 is irregular since the film 20 corresponds to the irregularities 24a. The irregularities diffuse reflected light so as to reduce or prevent ambient reflections, thereby achieving a wide-viewing-angle display. Furthermore, in each dot region, an insulation film 26 is disposed over an area corresponding to the reflective display area R on the reflective film 20. In other words, the insulation film 26 is selectively disposed over the reflective film 20, thereby providing different thicknesses of the liquid crystal layer 50 for the reflective display area R and the transmissive display area T. The insulation film 26 is, for example, an organic film formed of acrylic resin having a thickness of about 2 to 3 µm. The insulation film 26 has inclined areas in which the thickness of the film 26 changes continuously to form a slope 26a in the vicinity of the boundary between the reflective display area R and the transmissive display area T. The thickness of the liquid crystal layer 50 in the area without the insulation film 26 is about 4 to 6 µm. The thickness of the liquid crystal layer 50 in the reflective display area R is about half the thickness of the layer 50 in the transmissive display area T.

Accordingly, the insulation film 26 provides different thicknesses of the liquid crystal layer 50 for the reflective display area R and the transmissive display area T and therefore functions as a layer for determining the thickness of the liquid crystal layer 50. The angle between the surface of the main substrate body 10A and each of the slopes 26a of the insulation film 26 is about 5° to 50°. In the first exemplary embodiment, the edges of the upper surface of the insulation film 26 are substantially aligned with the edges of the reflective film 20 (the reflective display area R), and therefore, the inclined areas of the insulation film 26 are included in the transmissive display area T.

The surface of the TFT-array substrate 10, which includes the surface of the insulation film 26, is coated with the pixel electrode 9 of a transparent conductive film formed of, for example, indium tin oxide (referred to as ITO hereinafter), and an alignment film 27 formed of, for example, polyimide. Although the reflective film 20 and the pixel electrode 9 are disposed as separate components in the first exemplary embodiment, a metallic reflective film may alternatively be used as a pixel electrode in the reflective display area R.

On the other hand, in the transmissive display area T, the same insulation film 24 as in the reflective display area R is disposed over the main substrate body 10A. The surface of the insulation film 24 is provided with the irregularities 24a. The transmissive display area T does not have the reflective film 20 and the insulation film 26, but has the pixel electrode 9 and the alignment film 27 formed of, for example, polyimide. The pixel electrode 9 and the alignment film 27 both have irregularities that correspond to the surface of the insulation film 24. Accordingly, one of the liquid-crystal contact surfaces between which the liquid crystal layer 50 is disposed has irregularities in the transmissive display area T, and the liquid crystal molecules are aligned along the irregularities. In detail, each irregular portion on this liquid-crystal contact surface has an inclined plane which is sloped at a certain angle with respect to the flat surface of the main substrate body 10A. The directions in which the homeotropically-aligned liquid crystal molecules are tilted based on changes in the electric field are determined by the inclined planes. The irregularities on this liquid-crystal contact surface in the transmissive display area T are about 0.05 µm to 1.0 µm high, and the maximum angle of inclination is about 2° to 20°. The angle of inclination in this case is an angle defined between the main substrate body 10A and each of the inclined planes of the irregularities. If the irregularities have curved surfaces, the angle is defined between the main substrate body 10A and a plane tangential to each of the curved surfaces.

The insulation film 24 in the reflective display area R and the transmissive display area T is formed of the same resin material and in the same manufacturing process. In detail, the insulation film 24 is formed by patterning a resin resist and then applying another resin layer thereon. The patterned resin resist may also be heat-treated so that the pattern can be adjusted. The irregularities of the insulation film 24 are about 0.1 µm to 1.1 µm high, and the maximum angle of inclination is about 5° to 25°. The pixel electrode 9 and the alignment film 27 are then disposed over the insulation film 24. Accordingly, the irregularities of the liquid-crystal contact surface have the height and the maximum angle of inclination described above.

On the other hand, in each dot region, the opposing substrate 25 is provided with a color-filter layer 22 (red-colored layer 22R in FIG. 3(b)) on a main substrate body 25A (on the side of the main substrate body 25A adjacent to the liquid crystal layer 50) formed of a transparent material, such as quartz or glass. The edges of the colored layer 22R are surrounded by a black matrix BM which forms boundaries between the dot regions D1, D2, and D3.

On the side of the color-filter layer 22 adjacent to the liquid crystal layer 50, a common electrode 31 formed of a transparent conductive film of, for example, ITO and an alignment film 33 formed of, for example, polyimide are disposed. The common electrode 31 has a electrode opening 32 in the reflective display area R. The electrode opening 32 disposed in the common electrode 31 regulates the tilting directions of the liquid crystal molecules by applying an electric field in a slanted direction with respect to the substrate surface (or the direction of the homeotropic-alignment of the liquid crystal molecules).

Both alignment films 27 and 33 of the TFT-array substrate 10 and the opposing substrate 25, respectively, are given homeotropic-alignment treatments. Furthermore, a waveplate 18 and a polarizer 19 are disposed adjacent to the outer surface of the TFT-array substrate 10, and a waveplate 16 and a polarizer 17 are disposed adjacent to the outer surface of the opposing substrate 25 such that circularly-polarized light can enter the inner surface of the substrates. For the polarizer 17 (19) and the waveplate 16 (18), a circular polarizer having a combination of a polarizer and a λ/4 waveplate; a broadband circular polarizer having a combination of a polarizer, a λ/2 waveplate, and a λ/4 waveplate; or a viewing-angle compensation film having a combination of a-polarizer, a λ/2 waveplate, a λ/4 waveplate, and a negative C-plate (a waveplate having an optical axis oriented in its thickness direction) is used. A backlight 15, that is, a light source for the transmissive display, is provided outside the polarizer 19 of the TFT-array substrate 10.

In each dot region of the liquid crystal display device of the first exemplary embodiment, the insulation film 26 provided in the reflective display area R allows the liquid crystal layer 50 in the reflective display area R to have substantially half the thickness of the liquid crystal layer 50 in the transmissive display area T. This allows substantially equal retardations in the reflective display area R and the transmissive display area T, and also achieves higher contrast. An electric field is generated in a slanted direction by the electrode opening 32 disposed in the common electrode 31 in the reflective display area R, thereby regulating the tilting directions of the liquid crystal molecules. Furthermore, in the transmissive display area T, the irregularities on one of the liquid-crystal contact surfaces correspond to the irregularities 24a of the insulation film 24, whereby the tilting directions of the liquid crystal molecules are regulated when a voltage is applied to the display areas. Accordingly, wide-viewing-angle properties are achieved. In detail, a contrast of at least 1:10 is achieved using a 120° cone for the reflective display and at least 1:10 is achieved using a 160° cone for the transmissive display.

In the first exemplary embodiment, the irregularities on the liquid-crystal contact surface in the transmissive display area T are formed using the insulation film 24 which is to form irregularities for diffusion in the reflective display area R. For this reason, efficient manufacturing is achieved without requiring an additional manufacturing process.

Figure 9:
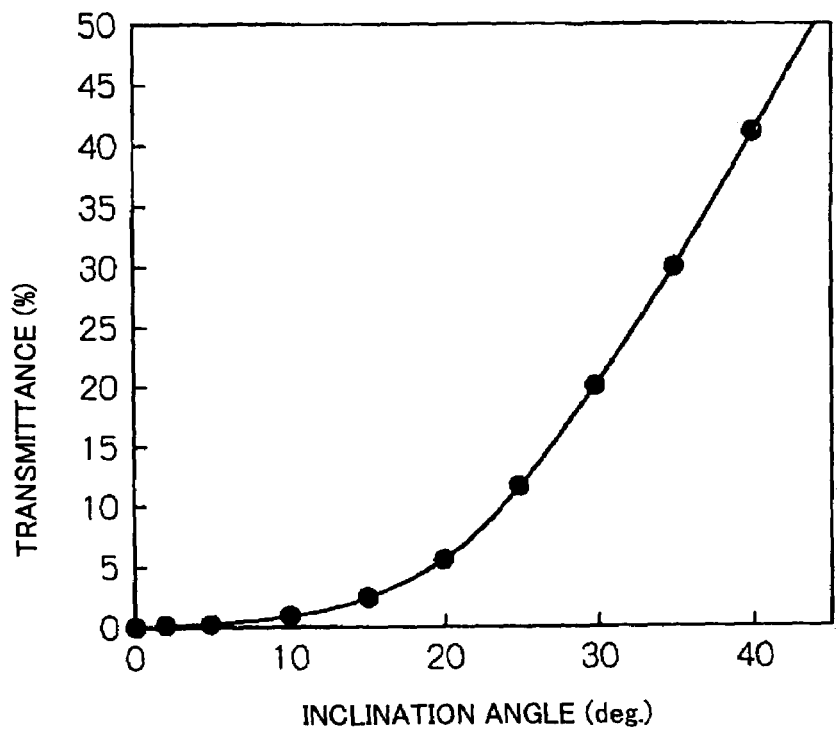
FIG. 9 illustrates a graph of the transmittance versus the inclination angle θ according to the liquid crystal display device of the first exemplary embodiment.

FIG. 9 shows a result of measuring the amount of light escaping from the inclined planes of the irregularities in the transmissive display area T with respect to an inclination angle θ when the voltage is turned off. In FIG. 9, the horizontal axis indicates the inclination angle θ and the vertical axis indicates the transmittance (%), the transmittance being 100% when the voltage is turned on. When the inclination angle θ exceeds 20°, the escaping light increases and the transmittance exceeds 5%. In this case, the contrast falls below 1:20. On the other hand, at least 2° of the inclination angle is required to tilt the liquid crystal molecules in one direction when a voltage is applied.

The vertical cross-section of one of the irregular portions on the liquid-crystal contact surface is substantially symmetrical. In detail, each irregular portion in the transmissive display area T has a shape of a conical frustum. This means that the liquid molecules may tilt in all directions so as to achieve wide-viewing-angle properties in all directions of the display face. For achieving these wide-viewing-angle properties, it is preferable for each irregular portion to be a circular cone or an elliptical cone, or to be a depression or a protrusion having the shape of a polygonal cone, a conical frustum, an elliptical frustum, or a polygonal frustum.

Second Exemplary Embodiment

A second exemplary embodiment of the present invention will now be described with reference to the figures.

Figure 4A:
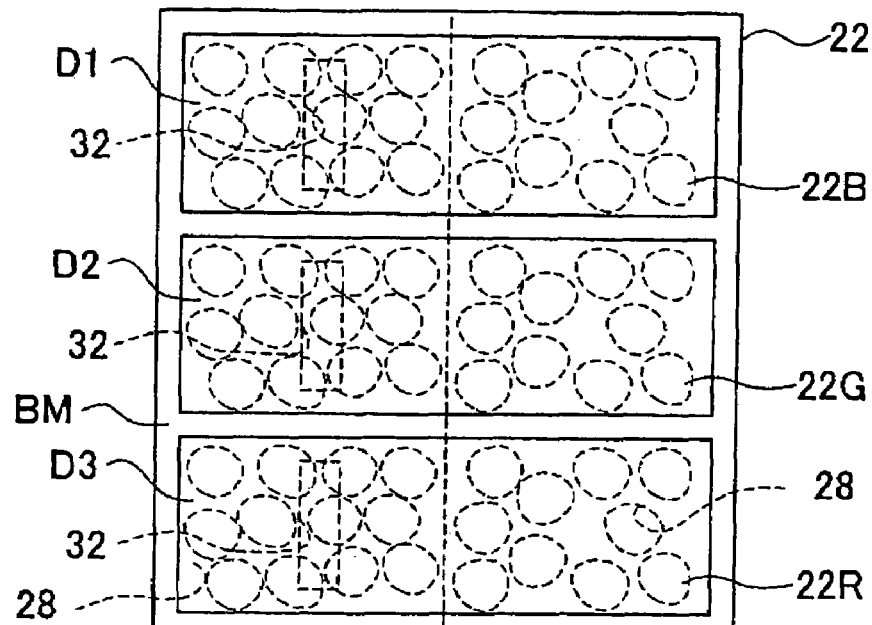
FIGS. 4(A) and 4(B) include a schematic plan view and cross-sectional view showing relevant components of the liquid crystal display device according to a second exemplary embodiment.
Figure 4B:
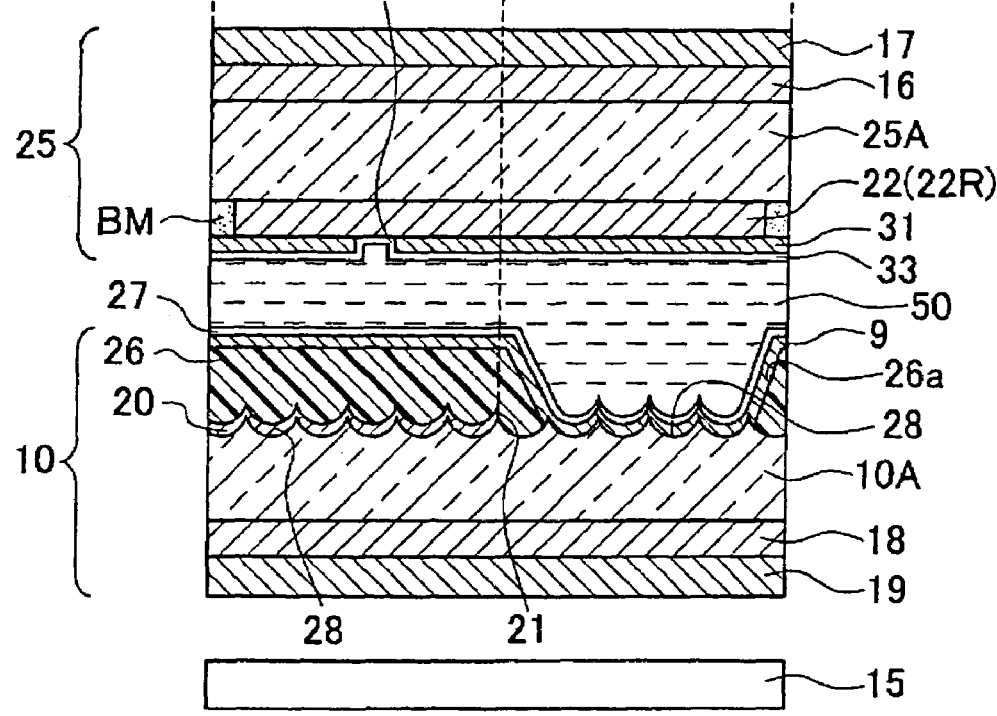

FIG. 4 includes a schematic plan view and cross-sectional view of a liquid crystal display device according to the second exemplary embodiment, and corresponds to FIG. 3 of the first exemplary embodiment. The basic structure of the liquid crystal display device of the second exemplary embodiment is equivalent to that of the first exemplary embodiment, but has a different configuration to form the irregularities. Accordingly, components in FIG. 4, similar to those in FIG. 3, are indicated by the same reference numerals, and the detailed descriptions of those components will be omitted.

As is shown in FIG. 4, instead of having the insulation film 24 as in FIG. 3, each dot region of the second exemplary embodiment has irregularities 28 on the surface of the main substrate body 10A adjacent to the liquid crystal layer 50 to form irregularities for diffusion in the reflective display area R of the reflective film 20. In other words, the reflective film 20 is disposed directly over the surface of the main substrate body 10A and is provided with the irregularities for light diffusion, which correspond to the surface of the main substrate body 10A.

On the other hand, the irregularities 28 of the main substrate body 10A are also provided in the transmissive display area T. In the transmissive display area T, the pixel electrode 9 and the alignment film 27 are disposed directly over the main substrate body 10A. On one of the liquid-crystal contact surfaces, irregularities, which correspond to the irregularities 28 of the main substrate body 10A, are provided.

The irregularities 28 of the main substrate body 10A may be formed by frosting. The maximum height of the irregularities 28 is from 0.3 μm to 0.7 μm (for example, 0.5 μm), and the maximum angle of inclination is from about 5° to 16° (for example, 12°). In the transmissive display area T, the pixel electrode 9 and the alignment film 27 are disposed over the irregularities 28, and the irregularities of the liquid-crystal contact surface have a maximum height of 0.2 μm to 0.6 μm (for example, 0.4 μm) and a maximum angle of inclination of 4° to 14° (for example, 10°).

Accordingly, in the case where the irregularities 28 of the main substrate body 10A are formed by frosting for light diffusion and also to control the alignment of the liquid crystal molecules, the present structure is advantageous over the structure in FIG. 3 for achieving a brighter display since the light is not absorbed by the insulation film 24. Furthermore, because the irregularities are randomly arranged, interference color is reduced or prevented. The irregularities of the reflective film 20 of this structure have less height and a smaller angle of inclination and thus provide a clearer reflective display with less graininess. The tilting directions of the liquid crystal molecules in the transmissive display area T when a voltage is applied are determined by the irregularities of the liquid-crystal contact surface. Thus, wide-viewing-angle properties are achieved.

Third Exemplary Embodiment

A third exemplary embodiment of the present invention will now be described with reference to FIG. 5.

Figure 5A:
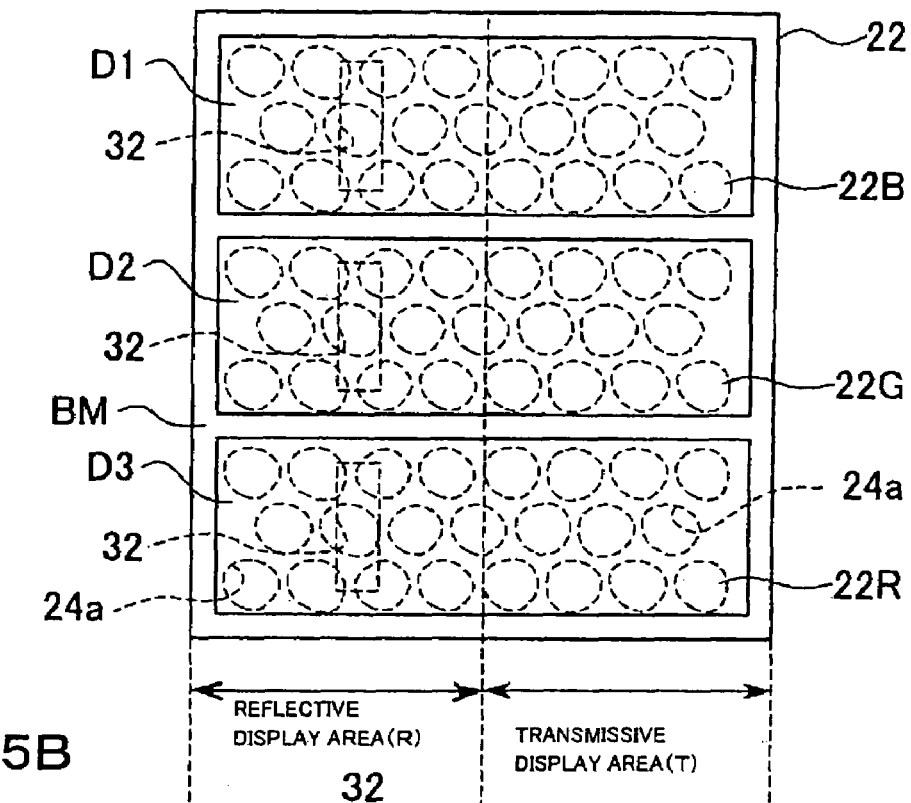
FIGS. 5(A) and 5(B) include a schematic plan view and cross-sectional view showing relevant components of the liquid crystal display device according to a third exemplary embodiment.
Figure 5B:
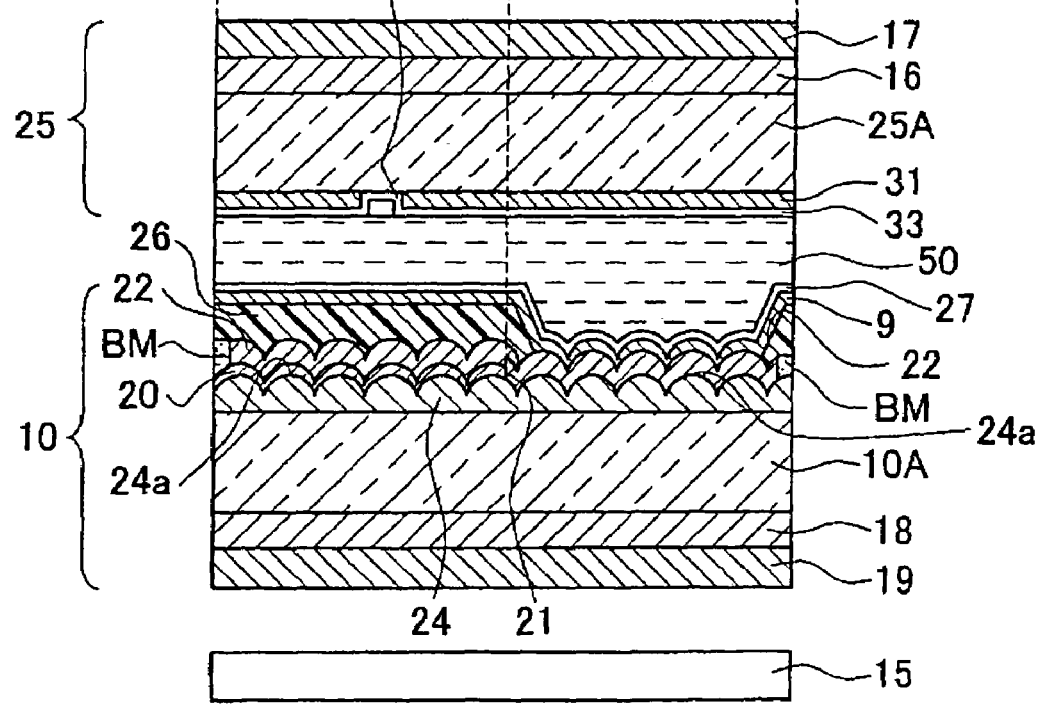

FIG. 5 includes a schematic plan view and cross-sectional view of a liquid crystal display device according to the third exemplary embodiment, and corresponds to FIG. 3 of the first exemplary embodiment. The basic structure of the liquid crystal display device of the third exemplary embodiment is equivalent to that of the first exemplary embodiment, but is different from the first exemplary embodiment of FIG. 3 in that the color-filter layer 22 is disposed adjacent to the TFT-array substrate 10. Accordingly, components in FIG. 5 similar to those in FIG. 3 are indicated by the same reference numerals, and the detailed descriptions of those components will be omitted.

In each dot region of the third exemplary embodiment, the insulation film 24 having the irregularities 24a, the reflective film 20, and the color-filter layer 22 are disposed over the reflective display area R of the main substrate body 10A. Furthermore, the insulation film 26 to determine the thickness of the liquid crystal layer 50, the pixel electrode 9, and the alignment film 27 are also disposed over the reflective display area R of the main substrate body 10A. On the other hand, in the transmissive display area T, the insulation film 24 having the irregularities 24a, the color-filter layer 22, the pixel electrode 9, and the alignment film 27 are disposed over the main substrate body 10A.

The irregularities 24a of the insulation film 24 requires a height of at least about 0.9 μm and a maximum angle of inclination of about 12°. Even if the insulation film 24 has a height of 0.9 μm and a maximum angle of inclination of 12°, because the film 24 is coated with the color-filter layer 22 with a thickness of approximately 1 μm and an overcoating layer (not shown in the figures) with a thickness of approximately 1 μm, the irregularities on one of the liquid-crystal contact surfaces in the transmissive display area T are reduced to about 0.05 μm in height and about 2° for the maximum angle of inclination. If the height and the maximum angle of inclination are further reduced, the controllability of the directions in which the liquid crystal molecules are tilted based on changes in the voltage applied may be dramatically deteriorated.

Providing the color-filter layer 22 adjacent to the TFT-array substrate 10, as in the third exemplary embodiment, can simplify the manufacturing process when a TFD (thin-film diode) element is disposed adjacent to the opposing substrate 25 in place of a TFT. Furthermore, in a case where the TFD element is disposed adjacent to the TFT-array substrate 10, misalignments can be reduced or prevented so that a high aperture ratio is achieved for a brighter display.

Fourth Exemplary Embodiment

A fourth exemplary embodiment of the present invention will now be described with reference to FIG. 6.

Figure 6A:
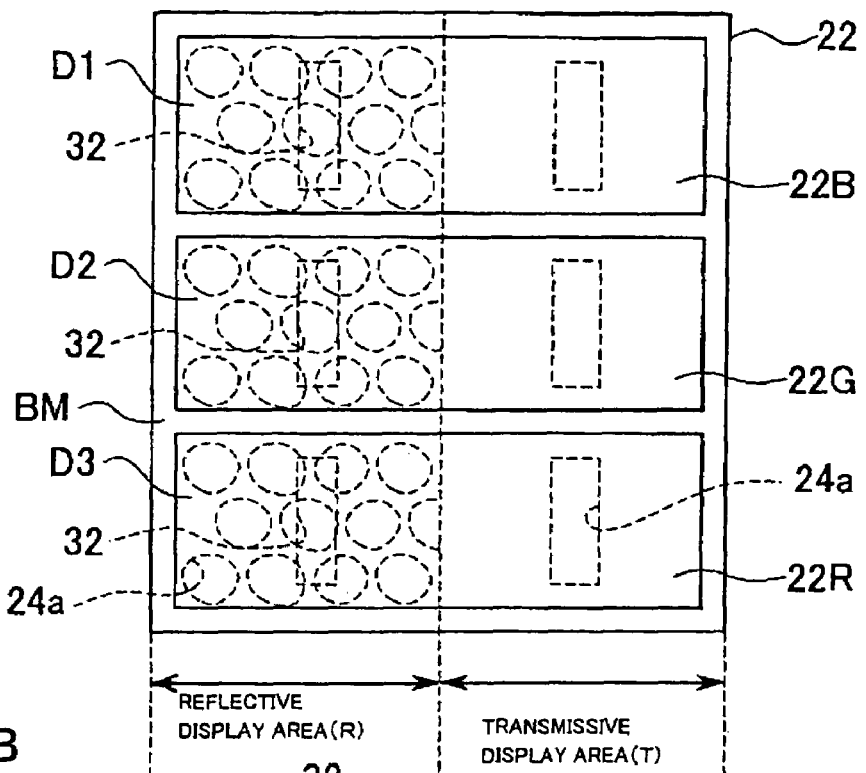
FIGS. 6(A) and 6(B) include a schematic plan view and cross-sectional view showing relevant components of the liquid crystal display device according to a fourth exemplary embodiment.
Figure 6B:
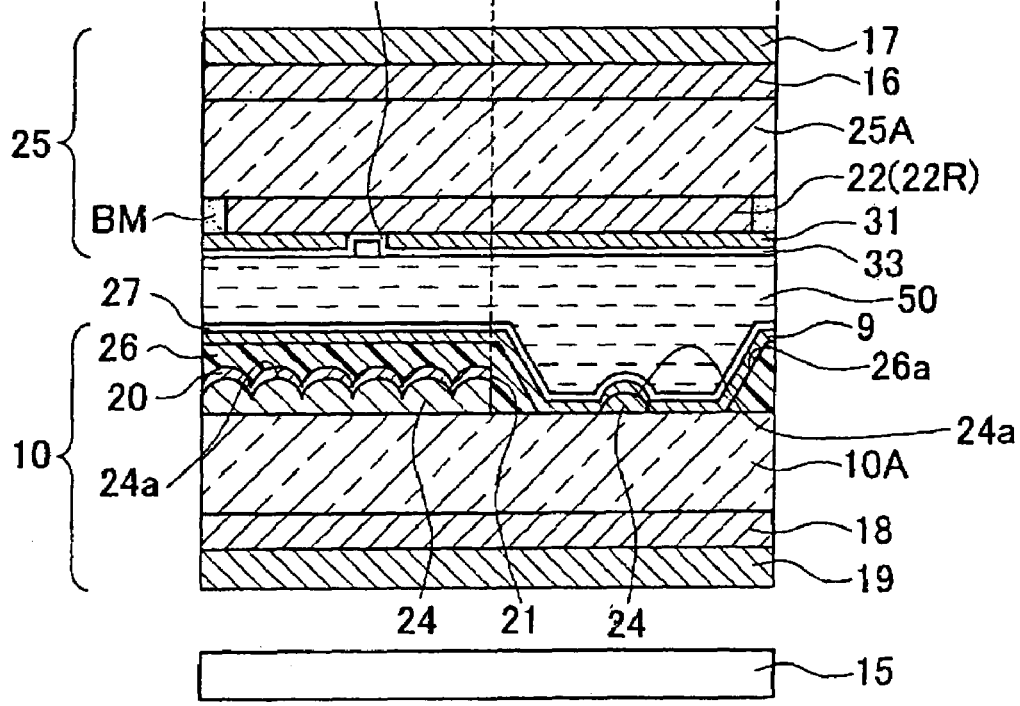

FIG. 6 includes a schematic plan view and cross-sectional view of a liquid crystal display device according to the fourth exemplary embodiment, and corresponds to FIG. 3 of the first exemplary embodiment. The basic structure of the liquid crystal display device of the fourth exemplary embodiment is equivalent to that of the first exemplary embodiment, but is different from the first exemplary embodiment of FIG. 3 in that the irregularities (irregular patterns) of the insulation film 24 in the reflective display areas R and the transmissive display areas T are different. Accordingly, components in FIG. 6, similar to those in FIG. 3, are indicated by the same reference numerals, and the detailed descriptions of those components will be omitted.

In each dot region of the fourth exemplary embodiment, the transmissive display area T of the insulation film 24 is less irregular than the reflective display area R of the film 24. In other words, an irregular portion of the insulation film 24 in the transmissive display area T occupies a relatively smaller surface area in plan view.

Irregularities in the transmissive display areas T pretilt the liquid crystal molecules and thus lower the transmittance and contrast to some extent. For this reason, in each dot region of the fourth exemplary embodiment, the area occupied by the irregular portion of the insulation film 24 in the transmissive display area T is made relatively small in plan view so that, in comparison with the first exemplary embodiment, for example, the transmittance is increased by 2% and the contrast by 7%. The tilting directions of the liquid crystal molecules in the transmissive display area T are controllable in the fourth exemplary embodiment, and wide-viewing-angle properties are thus achieved. The irregularities of the insulation film 24 in both display areas R and T can be formed in the same manufacturing process. The irregular portion disposed in the transmissive display area T is preferably a rectangular protrusion or depression at the center of the display area T.

Figure 11A:
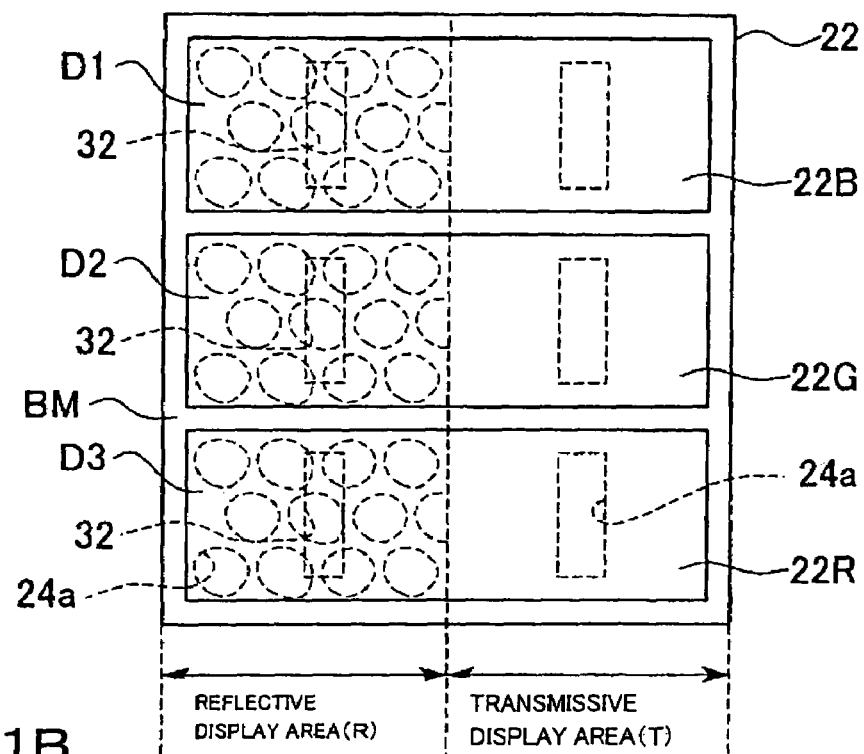
FIGS. 11(A) and 11(B) include a schematic plan view and cross-sectional view showing relevant components in a modification of the liquid crystal display device of the fourth exemplary embodiment.
Figure 11B:
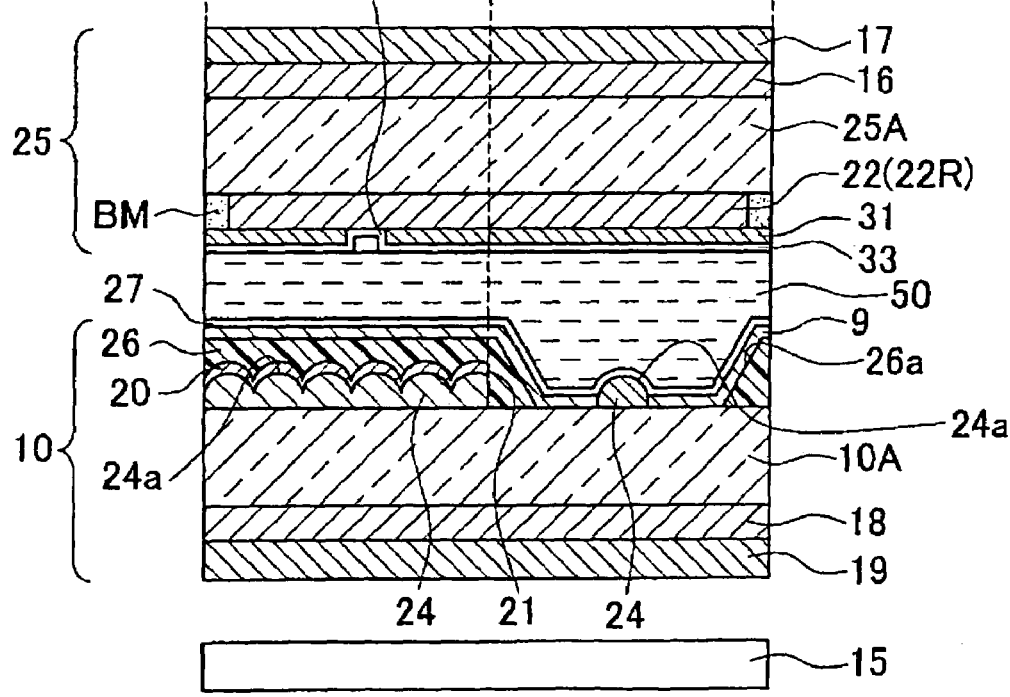

In this case, as is shown in FIG. 11, it is preferable that an opening, which corresponds to a protruding insulation film 24 (protruding portion) disposed in the transmissive display area T, be provided in the pixel electrode 9 on the inner surface of the main substrate body 10A. In other words, it is preferable that the pixel electrode 9 not be disposed over the insulation film 24 in the transmissive display area T.

Figure 12A:
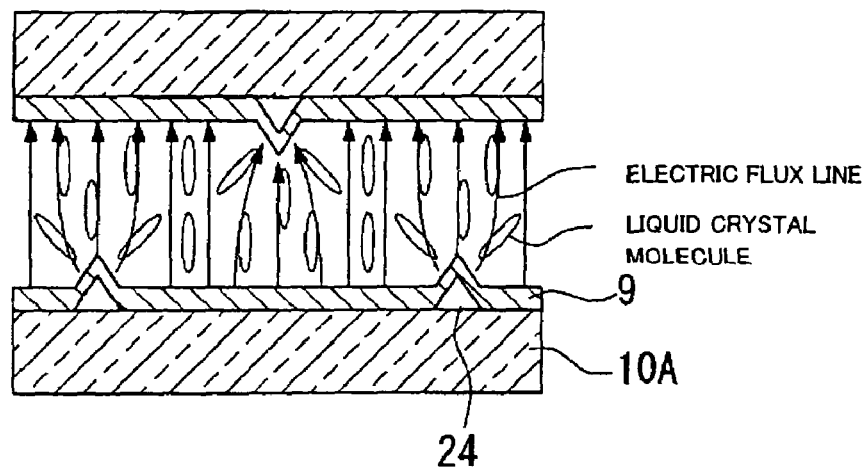
FIGS. 12(A) and 12(B) include schematics illustrating the operation of the liquid crystal display device of FIG. 11.
Figure 12B:
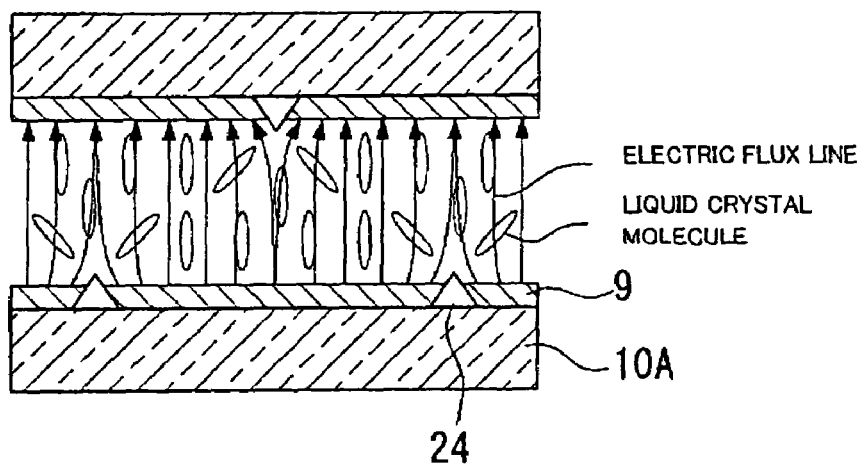

As is schematically shown in FIG. 12(A), when the pixel electrode 9 is disposed over the protruding insulation film 24, as in FIG. 6, the liquid crystal molecules and the electric flux lines tilt in the same directions, thus lowering the controllability of the alignment of the liquid crystal molecules. On the other hand, if the pixel electrode 9 is not disposed over the protruding insulation film 24, as in FIG. 11, the liquid crystal molecules and the electric flux lines tilt in opposite directions, as is schematically shown in FIG. 12(B). Accordingly, the tilting directions of the liquid crystal molecules are readily set, and the alignment of the liquid crystal molecules can be regulated with further stability. In this case, in contrast to having the protruding portion or the slit-like opening of the electrode separately, the area occupied by the protruding portion or the slit-like opening can be made smaller, thereby achieving brighter display.

Fifth Exemplary Embodiment

A fifth exemplary embodiment of the present invention will now be described with reference to FIG. 7.

Figure 7A:
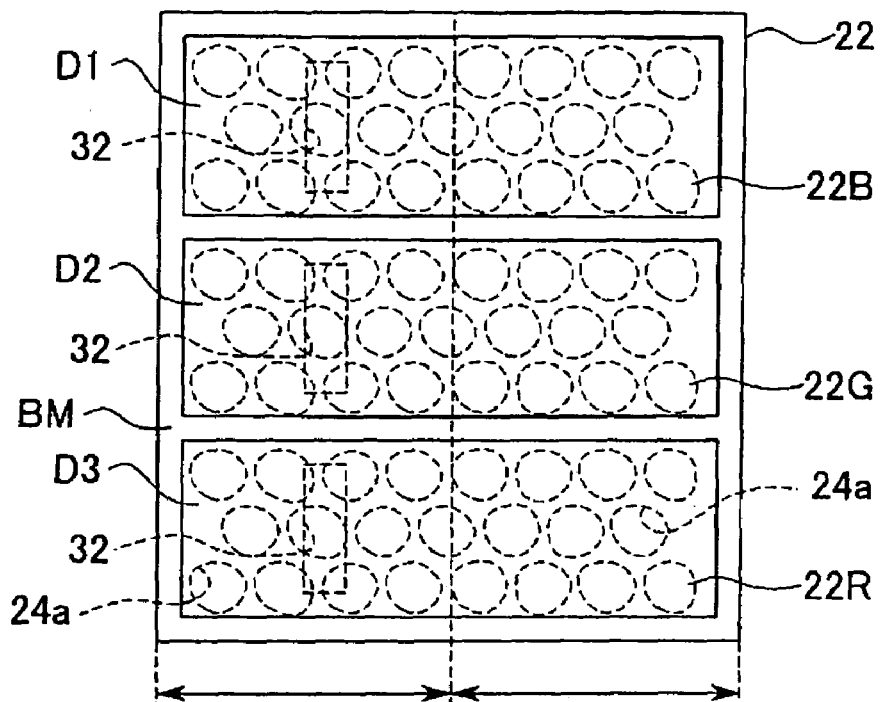
FIGS. 7(A) and 7(B) include a schematic plan view and cross-sectional view showing relevant components of the liquid crystal display device according to a fifth exemplary embodiment.
Figure 7B:
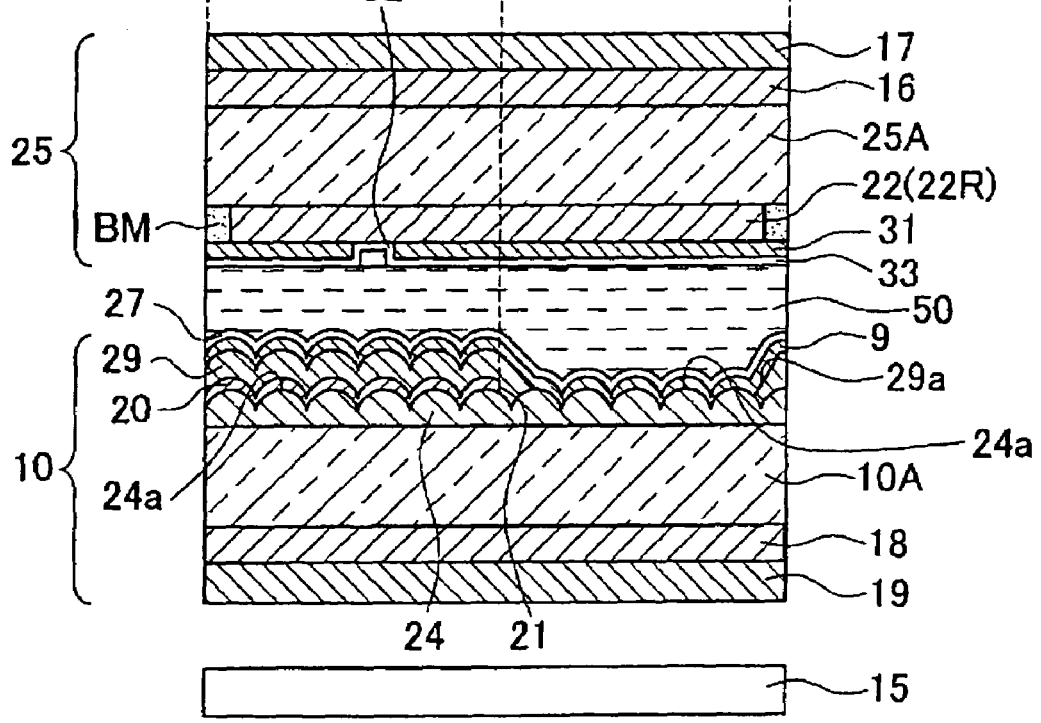

FIG. 7 includes a schematic plan view and cross-sectional view of a liquid crystal display device according to the fifth exemplary embodiment, and corresponds to FIG. 3 of the first exemplary embodiment. The basic structure of the liquid crystal display device of the fifth exemplary embodiment is equivalent to that of the first exemplary embodiment, but is different from the first exemplary embodiment of FIG. 3 in that the irregularities of the insulation film 24 are disposed continuously over the reflective display areas R of one of the liquid-crystal contact surfaces. Accordingly, components in FIG. 7, similar to those in FIG. 3, are indicated by the same reference numerals, and the detailed descriptions of those components will be omitted.

In each dot region of the fifth exemplary embodiment, irregularities in the reflective display area R are provided not only in the reflective film 20, whose irregularities correspond to the irregularities 24a of the insulation film 24, but also in the liquid-crystal contact surface. In detail, a resin film 29 having a relatively high degree of viscosity is provided as an insulation film that provides different thicknesses of the liquid crystal layer 50 in the reflective display area R and the transmissive display area T. The resin film 29 is thinner than the insulation film 26 (for example, about half the thickness of the film 26) of the first exemplary embodiment of FIG. 3.

With this structure, the tilting directions of the liquid crystal molecules are controllable both in the transmissive display area T and the reflective display area R, thus achieving wide-viewing-angle properties for both transmissive and reflective display. In this case, the insulation film 24 requires a height of at least 1.1 μm and a maximum angle of inclination of about 25°. Because the resin film 29 with a thickness of approximately 1.5 μm is disposed over the insulation film 24, even when the film 24 has the height and the maximum angle of inclination as mentioned above, the height of the irregularities on the liquid-crystal contact surface is lowered to about 0.1 μm, and the maximum angle of inclination is lowered to about 3°.

Such height and maximum angle of inclination of the irregularities on the liquid-crystal contact surface enable sufficient control of the tilting directions of the liquid crystal molecules. If the height and the maximum angle of inclination of the irregularities on the liquid-crystal contact surface are lower than those mentioned above, the controllability of the directions in which the liquid molecules are tilted based on changes in the voltage may be deteriorated.

Sixth Exemplary Embodiment

A sixth exemplary embodiment of the present invention will now be described with reference to FIG. 8.

Figure 8A:
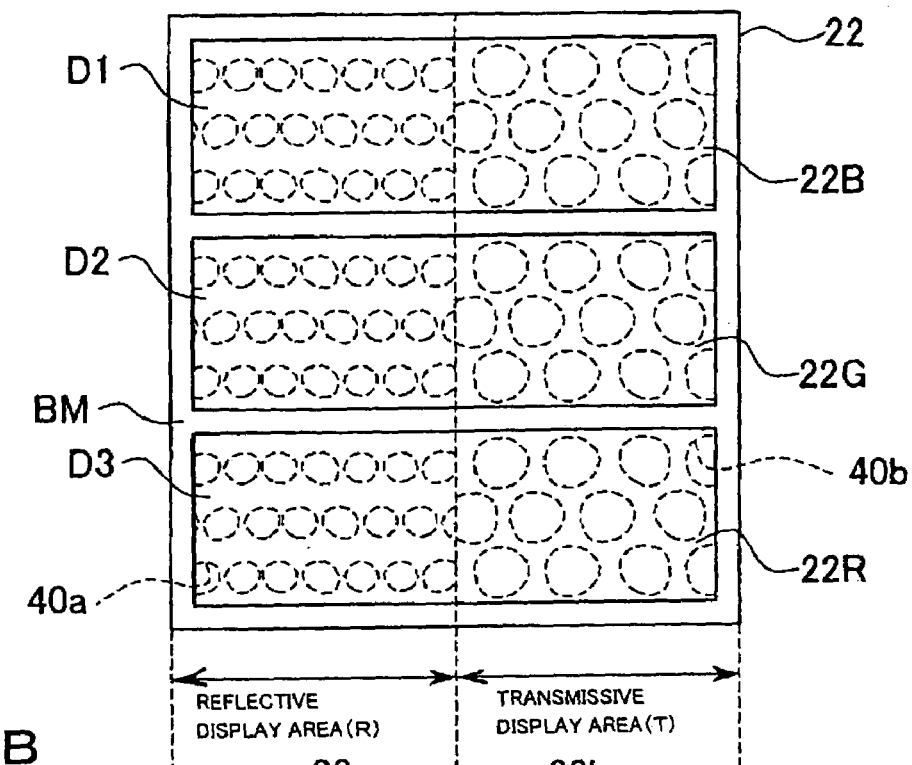
FIGS. 8(A) and (B) include a schematic plan view and cross-sectional view showing relevant components of the liquid crystal display device according to a sixth exemplary embodiment.
Figure 8B:
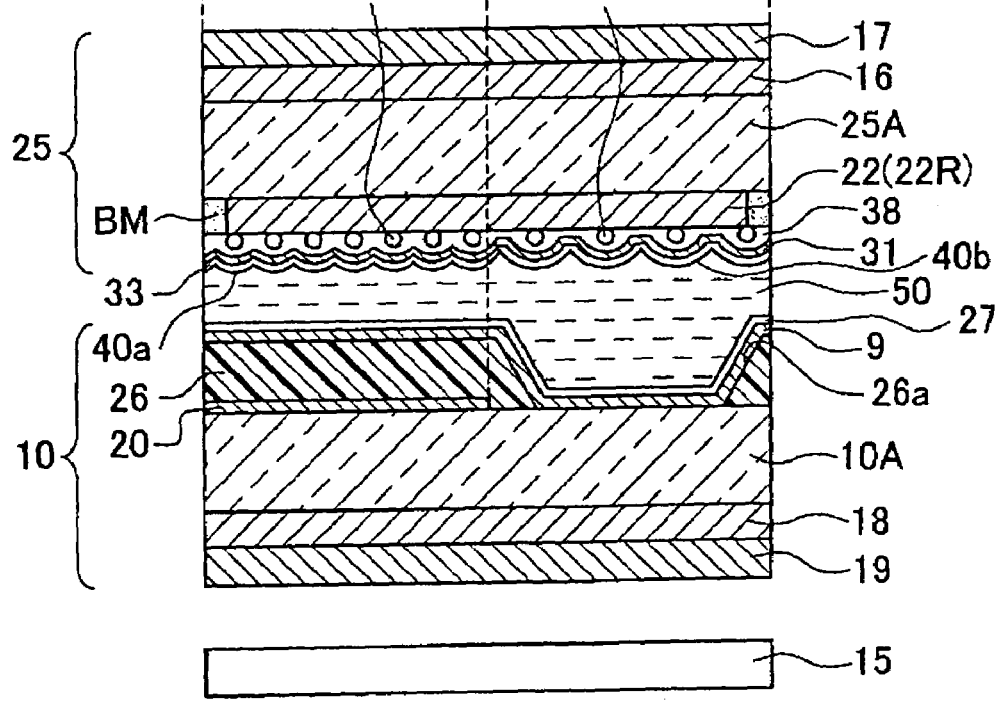

FIG. 8 includes a schematic plan view and cross-sectional view of a liquid crystal display device according to the sixth exemplary embodiment, and corresponds to FIG. 3 of the first exemplary embodiment. The basic structure of the liquid crystal display device of the sixth exemplary embodiment is equivalent to that of the first exemplary embodiment, but is different from the first exemplary embodiment of FIG. 3 in that the irregularities for light diffusion are not directly provided in the reflective film 20. Accordingly, components in FIG. 8, similar to those in FIG. 3, are indicated by the same reference numerals, and the detailed descriptions of those components will be omitted.

In each dot region of the sixth exemplary embodiment, the reflective display area R includes the reflective film 20 and the insulation film 26, which are disposed over the main substrate body 10A of the TFT-array substrate 10. Furthermore, the pixel electrode 9 and the alignment film 27 are disposed on the insulation film 26. The reflective film 20 has no irregularities for light diffusion. In the transmissive display area T, the pixel electrode 9 and the alignment film 27 are disposed over the main substrate body 10A, and the liquid-crystal contact surface of the TFT-array substrate 10 also has no irregularities.

On the color-filter layer 22 of the opposing substrate 25, a layer which has resin balls 39a and 39b with an average diameter of 0.5 µm to 2.0 µm distributed in a resin binder 38 having a different refractive index is disposed as a light-diffusing layer for diffusing light transmitting through the layer. The resin balls 39b are distributed relatively sparsely over the transmissive display area T, whereas the resin balls 39a are distributed relatively densely over the reflective display area R. The distribution of the resin balls 39a and 39b forms irregularities over the surface of the resin binder 38. Furthermore, the common electrode 31 and the alignment film 33 are disposed over the resin binder 38. The surface of the alignment film 33 is thus provided with irregularities corresponding to the irregularities of the resin binder 38.

In this case, since the distribution density of the resin balls 39b in the transmissive display area T is relatively lower, the resin binder 38 and the liquid-crystal contact surface have irregular portions each having a relatively gentle incline. On the other hand, the high distribution density of the resin balls 39a in the reflective display area R forms more irregular portions, thus further enhancing the light diffusing effect. In the reflective display area R of the opposing substrate 25, the irregularities on the liquid-crystal contact surface have a height of, for example, about 0.15 µm to 0.8 µm and a maximum angle of inclination of, for example, about 5° to 13°. In the transmissive display area T of the opposing substrate 25, the irregularities on the liquid-crystal contact surface have a height of, for example, about 0.2 µm to 1.0 µm and a maximum angle of inclination of, for example, about 3° to 8°.

This structure reduces or prevents ambient reflections in the reflective display and achieves wide-viewing-angle display. Furthermore, the directions in which the liquid crystal molecules are tilted based on the voltage applied can be controlled both in the transmissive display area T and reflective display area R, thereby providing further enhanced wide-viewing-angle display. In contrast to providing the irregularities in the insulation film of, for example, resin, employing this structure for the light diffusing-function obviates a photolithography process, thereby reducing the cost.

Seventh Exemplary Embodiment

A seventh exemplary embodiment of the present invention will now be described with reference to FIG. 13.

Figure 13A:
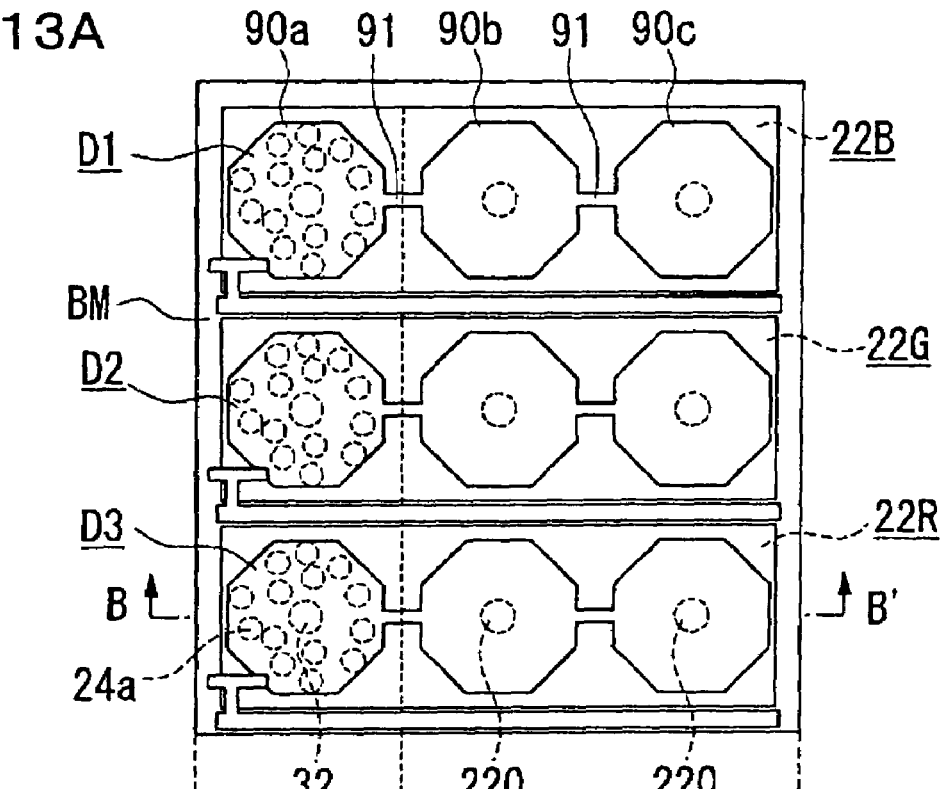
FIGS. 13(A) and 13(B) include a schematic plan view and cross-sectional view showing relevant components of the liquid crystal display device according to a seventh exemplary embodiment.
Figure 13B:
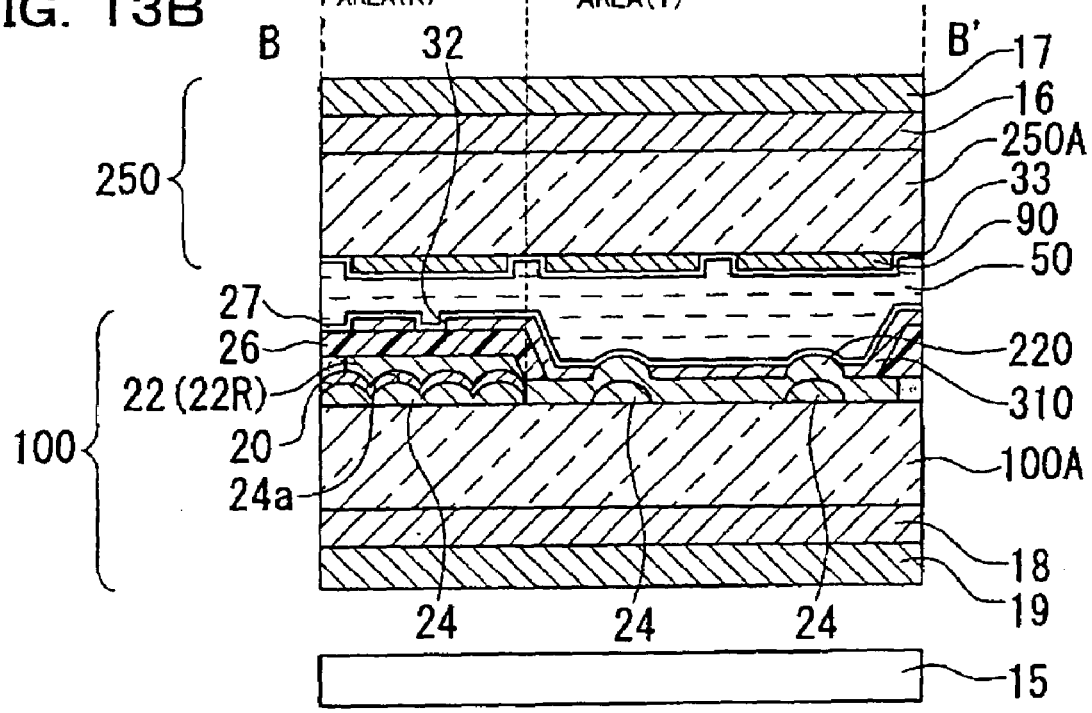

FIG. 13 includes a schematic plan view and cross-sectional view of a liquid crystal display device according to the seventh exemplary embodiment, and corresponds to FIG. 3 of the first exemplary embodiment. The basic structure of the liquid crystal display device of the seventh exemplary embodiment is equivalent to that of the first embodiment, but is different from the first exemplary embodiment of FIG. 3 in that each dot region includes a thin-film diode (TFD) as the switching element, and that the substrate having the color-filter layer 22 is different from that of the first exemplary embodiment. Accordingly, components in FIG. 13 similar to those in FIG. 3 are indicated by the same reference numerals, and the detailed descriptions of those components will be omitted.

As mentioned above, each dot region of the seventh exemplary embodiment includes a thin-film diode (TFD) as the switching element. A pixel electrode 90 is disposed over a main substrate body 250A disposed adjacent to the viewer (upper side) to form a TFD-array substrate 250. On the other hand, a striped common electrode 310 and the reflective film 20 are disposed over a main substrate body 100A disposed adjacent to the backlight 15 to form an opposing substrate 100.

As in the fourth exemplary embodiment, the irregularities (irregular patterns) of the insulation film 24 in the seventh exemplary embodiment are different in the reflective display area R and the transmissive display area T. In detail, the transmissive display area T of the insulation film 24 is less irregular than the reflective display area R of the film 24. This means that the irregular portions (protruding portions in FIG. 13) of the insulation film 24 in the transmissive display area T occupy relatively less surface area in plan view. As described previously, irregularities in the transmissive display areas T pretilt the liquid crystal molecules, and therefore lower the transmittance and contrast to some extent. Consequently, in each dot region of the seventh exemplary embodiment, the area occupied by the irregular portions of the insulation film 24 in the transmissive display area T is made relatively small in plan view so that, in comparison with the first exemplary embodiment, for example, the transmittance is increased by 2% and the contrast by 7%. The tilting directions of the liquid crystal molecules in the transmissive display area T are controllable in the seventh exemplary embodiment, and wide-viewing-angle properties are thus achieved. The irregularities of the insulation film 24 in both display areas R and T can be formed in the same manufacturing process.

The color-filter layer 22 is disposed adjacent to the main substrate body 100A (adjacent to the substrate with the reflective film 20), and protruding portions 220 of the color-filter layer 22 are disposed over the protruding portions of the insulation film 24. The seventh exemplary embodiment includes openings, which correspond to the protruding portions 220 of the color-filter layer 22, in the striped common electrode 310 disposed on the inner surface of the main substrate body 100A. In other words, the common electrode 310 is selectively not disposed over the protruding portions 220 of the color-filter layer 22 in the transmissive display area T. In this case, as shown in FIG. 12, the liquid crystal molecules and the electric flux lines tilt in opposite directions. Accordingly, the tilting directions of the liquid crystal molecules are readily set, and the alignment of the liquid crystal molecules can be regulated with further stability.

Each of the dots D1, D2, and D3 of the seventh exemplary embodiment includes divisions that form sub-dots (three divisions in FIG. 13) having substantially the same shape. In other words, the pixel electrode 90 includes a plurality of divisions 90a, 90b, and 90c (three divisions in FIG. 13) and connecting segments 91 and 91 that electrically connect the adjacent divisions, the divisions 90a, 90b, and 90c each forming a sub-dot. Although each of the sub-dots (divisions 90a, 90b, and 90c) has a shape of a regular octagon in FIG. 13, the sub-dots are not limited to this shape and may alternatively be circular or polygonal. Adjacent to the main substrate body 100A of the opposing substrate 100, an electrode opening 32 and protruding portions 220 and 220 are disposed such that the opening 32 and the portions 220 and 220 face the center of the corresponding sub-dots (divisions 90a, 90b, and 90c).

To form the protruding portions 220, the same material and manufacturing process as the insulation film 24 in the reflective display area R for forming light-diffusing irregularities are used. The protruding portions 220 are not disposed in the reflective display area R. The reflective display area R has a higher horizontal electric field than the transmissive display area T due to having a smaller cell thickness (thickness of the liquid crystal layer 50) than the area T, and therefore, the alignment of the liquid crystal molecules can be regulated sufficiently simply by providing the opening 32 in the common electrode 310 in the area R. Furthermore, the liquid crystal molecules of each sub-dot can be tilted in all directions from the electrode opening 32 or the protruding portion 220, which faces the center of the corresponding sub-dot. Accordingly, a bright display with a remarkably wide viewing angle is achieved. Furthermore, the reduction or prevention of disclination increases the response speed.

Electronic Apparatus

An example of an electronic apparatus having the liquid crystal display device according to the above exemplary embodiments of the present invention will now be described.

Figure 10:
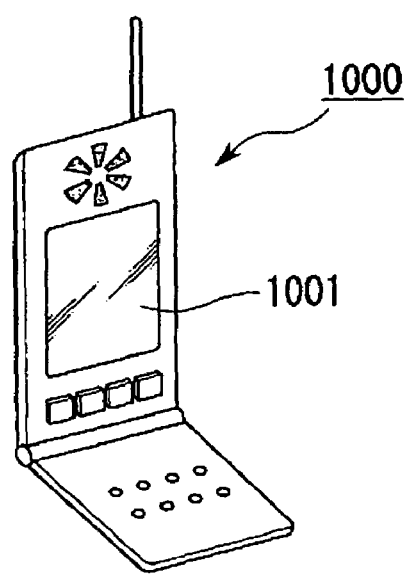
FIG. 10 is a perspective view of an example of an electronic apparatus according to the present invention.

FIG. 10 is a perspective view of an example of a cellular phone. In FIG. 10, reference numeral 1000 indicates a cellular-phone body and reference numeral 1001 indicates a display employing the above liquid crystal display device. When the liquid crystal display device of the above exemplary embodiments is employed in the display of an electronic apparatus such as a cellular phone, an electronic apparatus having a bright, wide-viewing-angle liquid crystal display with high contrast is achieved regardless of the environment in which the apparatus is used.

The technical scope of the present invention is not limited to the above exemplary embodiments, and modifications are permissible within the scope and spirit of the present invention. For example, although the above exemplary embodiments describe the application of the present invention to the active-matrix liquid crystal display device having the TFTs or the TFDs as the switching elements, the present invention may also be applied to, for example, a passive-matrix liquid crystal display device. Specific descriptions of materials, sizes, and shapes of the components may also be modified.

What is claimed is:

1. A liquid crystal display device, comprising:
a pair of substrates;
a liquid crystal layer disposed between the pair of substrates; and
dot regions each having a transmissive display area for transmissive display and a reflective display area for reflective display,
the liquid crystal layer including negative dielectric anisotropy liquid crystals with homeotropic alignment in an initial state,
the reflective display area including a light-diffusing device to diffuse reflected light, and
the transmissive display area including a liquid-crystal-contact-surface-roughness-forming device to form irregularities on one of liquid-crystal contact surfaces of the substrates between which the liquid crystal layer is disposed, the irregularities determining tilt of the liquid crystals based on changes in an electric field applied to the liquid crystal layer, and
the light-diffusing device and the liquid-crystal-contact-surface-roughness-forming device being formed of the same material.

2. The liquid crystal display device according to claim 1, the irregularities in the transmissive display area determining the directions in which the homeotropically-aligned liquid crystal molecules are tilted based on a change in electric field.

3. The liquid crystal display device according to claim 1, the pair of substrates including of an upper substrate body and a lower substrate body, and
the side of the lower substrate body opposite to the liquid crystal layer being provided with a backlight for transmissive display, and the side of the lower substrate body adjacent to the liquid crystal layer being provided with a reflective film selectively disposed only over the reflective display area, and
the reflective display area including an irregular layer, as the light-diffusing device, on which the reflective film is disposed so that the reflective film is provided with irregularities.

4. The liquid crystal display device according to claim 3, the irregular layer being also disposed in the transmissive display area and functioning as the liquid-crystal-contact-surface-roughness-forming device to form irregularities on the liquid-crystal contact surface in the transmissive display area.

5. The liquid crystal display device according to claim 3, the reflective display area including irregularities on the liquid-crystal contact surface which correspond to the irregularities of the reflective film, the irregularities of the contact surface determining the directions in which the homeotropically-aligned liquid crystal molecules are tilted based on a change in electric field.

6. The liquid crystal display device according to claim 3, the side of the lower substrate body adjacent to the liquid crystal layer being provided with irregularities acting as the light-diffusing device, the irregularities of the lower substrate body also being disposed over the transmissive display area to form the irregularities on the liquid-crystal contact surface in the transmissive display area.

7. The liquid crystal display device according to claim 3, the resin layer being provided with irregularities acting as the light-diffusing device and is disposed between the lower substrate body and the reflective film, the resin layer also being disposed over the transmissive display area so as to form the irregularities on the liquid-crystal contact surface of the transmissive display area.

8. The liquid crystal display device according to claim 1, the irregularities of the liquid-crystal contact surface in the transmissive display area having a height of 0.05 μm to 1.0 μm.

9. The liquid crystal display device according to claim 1, each irregular portion of the irregularities of the liquid-crystal contact surface in the transmissive display area having an inclined plane with a maximum angle of inclination of 2° to 20°.

10. The liquid crystal display device according to claim 1, an inner surface of at least one of the pair of substrates including at least one protrusion that functions as the liquid-crystal-contact-surface-roughness-forming device, and an electrode having at least one opening disposed over the inner surface such that the opening corresponds to the protrusion.

11. The liquid crystal display device according to claim 1, an inner surface of at least one of the pair of substrates including a color-filter layer having predetermined at least one protrusion, the protrusion functioning as the liquid-crystal-contact-surface-roughness-forming device.

12. An electronic apparatus, comprising:
a liquid crystal display device according to claim 1.

13. The liquid crystal display device according to claim 1, the light-diffusing device being disposed in between the liquid crystal layer and one of the pair of substrates, and further comprising an electrode formed in the reflective display area in between the liquid crystal layer and the other of the pair of substrates, the electrode including a slit that determines tilt of the liquid crystals based on changes in the electric field applied to the liquid crystal layer.

* * * * *